US012530767B2

(12) United States Patent
Grieser et al.

(10) Patent No.: US 12,530,767 B2
(45) Date of Patent: Jan. 20, 2026

(54) COMPUTER-IMPLEMENTED TRAINING SYSTEM AND METHOD FOR USER-INTERACTIVE TRAINING OF METHODS PERFORMABLE IN AN IVD LABORATORY SYSTEM

(71) Applicant: Roche Diagnostics Operations, Inc., Indianapolis, IN (US)

(72) Inventors: Christopher Grieser, Lampertheim (DE); Steffen Koch, Ronshausen (DE); Michael Schaletzki, Paoli, PA (US); Oliver Stockmann, Baden-Wurttemburg (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 430 days.

(21) Appl. No.: 18/145,513

(22) Filed: Dec. 22, 2022

(65) Prior Publication Data
US 2023/0230239 A1    Jul. 20, 2023

(30) Foreign Application Priority Data

Jan. 19, 2022  (EP) .................................... 22152302

(51) Int. Cl.
*G06T 7/00*      (2017.01)
*G01N 35/02*     (2006.01)
(Continued)

(52) U.S. Cl.
CPC .......... *G06T 7/0012* (2013.01); *G01N 35/02* (2013.01); *G06F 3/04815* (2013.01);
(Continued)

(58) Field of Classification Search
None
See application file for complete search history.

(56) References Cited

U.S. PATENT DOCUMENTS 8,406,682 B2   3/2013 Elesseily et al.
8,562,357 B2   10/2013 Pfingsten et al.
(Continued)

FOREIGN PATENT DOCUMENTS

WO    2013/170204 A1    11/2013
WO    2021/159132 A1    8/2021

OTHER PUBLICATIONS

European Search Report issued Jun. 24, 2022, in Application No. EP 22152302.0, 2 pp.

*Primary Examiner* — Anh-Tuan V Nguyen
(74) *Attorney, Agent, or Firm* — Lee & Hayes, P.C.

(57) ABSTRACT

The present disclosure refers to a computer-implemented training system for user-interactive training of a plurality of in-vitro diagnostic (IVD) methods performable in an IVD laboratory system, comprising: one or more data processors; a memory device connected to the one or more data processors; a user interface provided with an output device having a display device and an input device configured to receive user input; and one or more software applications running on the one or more data processors and having a plurality of application modules. The plurality of application modules is further configured to control, in response to receiving user input, output of a plurality of views of the IVD laboratory system through the display device according to view output control data indicative of view parameters assigned to a view output mode from a plurality of view output modes; receive a training mode selection user input indicative of a user selection for an IVD method to be trained from the plurality of methods having an assigned view output mode of the plurality of view output modes.

22 Claims, 6 Drawing Sheets

(51) Int. Cl.
 *G06F 3/04815* (2022.01)
 *H04N 13/239* (2018.01)

(52) U.S. Cl.
 CPC ....... *H04N 13/239* (2018.05); *G06T 2200/24* (2013.01); *G06T 2207/20081* (2013.01); *G06T 2207/30024* (2013.01); *G06T 2210/41* (2013.01)

(56) References Cited

U.S. PATENT DOCUMENTS

| | | |
|---|---|---|
| 9,652,590 B2 | 5/2017 | Yeager |
| 2012/0063657 A1* | 3/2012 | Ribbing ................. A61N 5/103 382/128 |
| 2016/0125765 A1 | 5/2016 | Meretei et al. |
| 2017/0017538 A1* | 1/2017 | Rudorfer ............. G06F 11/0769 |

* cited by examiner

Fig. 5a
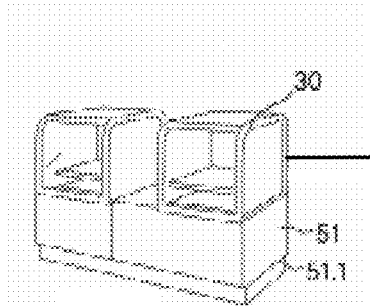
Fig. 5b
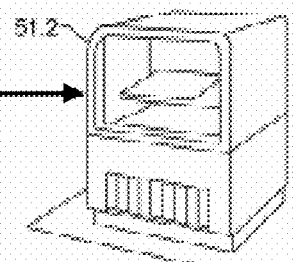
Fig. 5c
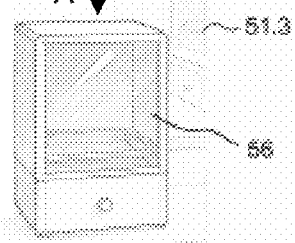
Fig. 5e
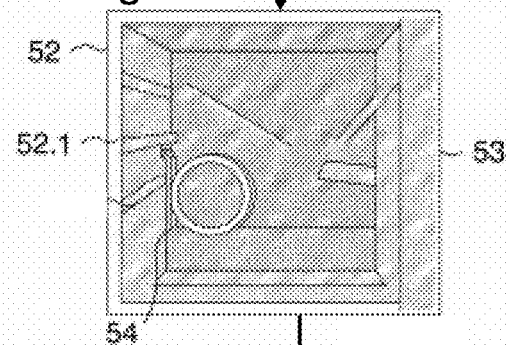
Fig. 5d
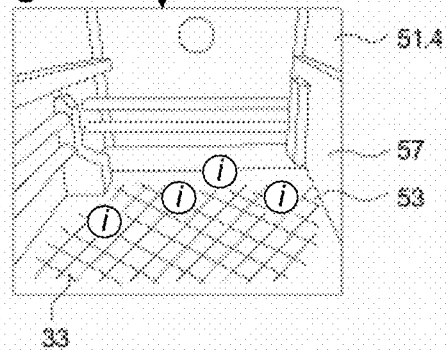
Fig. 5f
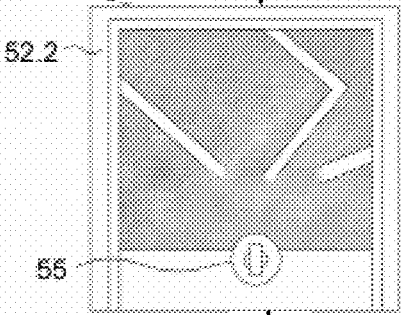
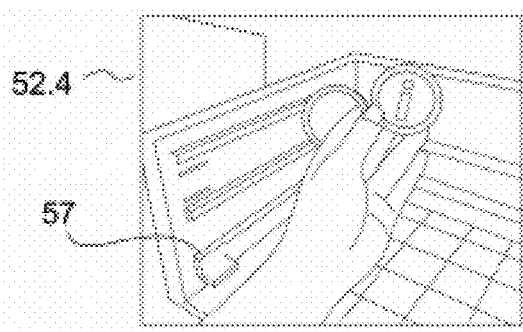
Fig. 5h
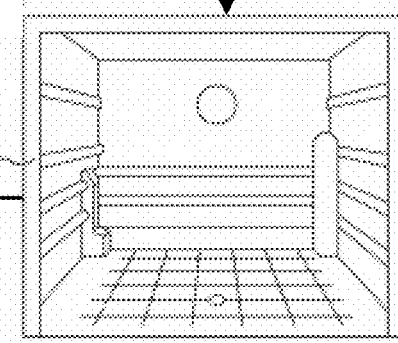
Fig. 5g

COMPUTER-IMPLEMENTED TRAINING SYSTEM AND METHOD FOR USER-INTERACTIVE TRAINING OF METHODS PERFORMABLE IN AN IVD LABORATORY SYSTEM

CROSS-REFERENCE TO RELATED APPLICATIONS

This application claims priority to European Patent Application No. 22152302.0, filed Jan. 19, 2022, the disclosure of which is hereby incorporated by reference in its entirety.

TECHNICAL FIELD

The present disclosure refers to a computer-implemented training system for user-interactive training of methods performable in an IVD laboratory system. Further, the present disclosure refers to a method for user-interactive training of methods performable in an IVD laboratory system by a computer-implemented training system.

BACKGROUND

In-vitro-diagnostics (IVD) laboratory systems are applied to test/analyze, in particular essentially automatically, samples such as blood or tissue samples that have been taken from the human body, e.g., samples of a bodily fluid. In-vitro-diagnostics can detect diseases or other conditions and can be used to monitor a person's overall health to help cure, treat, or prevent diseases. IVD laboratory systems also may be applied in precision medicine to identify patients who are likely to benefit from specific treatments or therapies. In-vitro-diagnostics tests conducted by the IVD laboratory system are typically used in laboratory or other health professional settings.

Such IVD laboratory systems can comprise a plurality of IVD instruments. An IVD instrument can be provided with a plurality of IVD components or (e.g. device or instrument) modules. An IVD instrument can be, for example, a pre-analytical, an analytical, and/or a post-analytical IVD instrument. In an IVD laboratory system, the IVD sample containers typically are moved along a line of processing for processing. For example, the IVD samples containers may be moved or relocated from a first IVD instrument to a second IVD instrument provided in the line of processing in the IVD laboratory system. The IVD instruments may provide for an IVD working station or location.

SUMMARY

It is an objective of the present disclosure to provide improved technology for facilitating a user to perform (required) manual steps in an in-vitro-diagnostics (IVD) laboratory system, in particular efficiently, reliably, and/or quickly.

For solving the problem, a computer-implemented training system for user-interactive training of methods performable in an IVD laboratory system according to some embodiments is provided. Further, a method for user-interactive training of methods performable in an IVD laboratory system by a computer-implemented training system according to some embodiments is provided. Further embodiments are disclosed in dependent claims.

BRIEF DESCRIPTION OF THE DRAWINGS

In the following, embodiments, by way of example, are described with reference to figures. In the figures:

FIGS. 5A-5H show a graphical representation of exemplary views/images output by the display device that are displayed during training according to a first embodiment.

DETAILED DESCRIPTION

Figure 1:
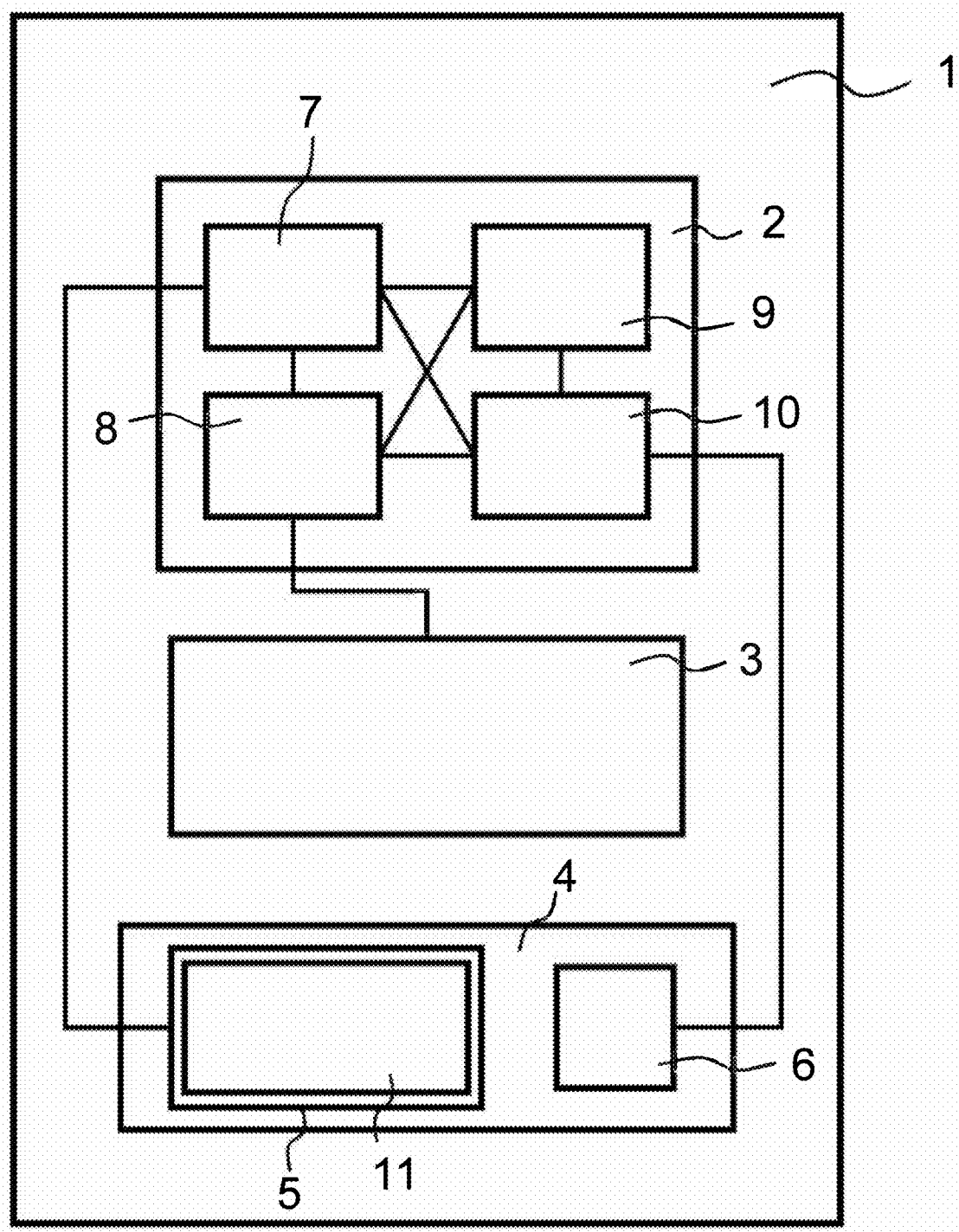
FIG. 1 shows a graphical representation of an embodiment of the computer-implemented training system for user-interactive training of methods performable in an IVD laboratory system.

According to some aspects of the disclosure, a computer-implemented training system for user-interactive training of methods performable in an IVD laboratory system may include: one or more data processors; a memory device connected to the one or more data processors; a user interface provided with an output device having a display device and an input device configured to receive user input; and one or more software applications running on the one or more data processors and having a plurality of application modules. The plurality of application modules is configured to control user-interactive training for a plurality of methods performable in the IVD laboratory system, each of the methods having assigned a sequence of method steps, which may be for at least some methods an ordered sequence of steps. The plurality of application modules is further configured to: control, in response to receiving first user input, output of first views of the IVD laboratory system through the display device according to first view output control data indicative of a first set of view parameters assigned to a first view output mode from the plurality of view output modes; receive a training mode selection user input indicative of a user selection for a method to be trained from plurality of methods; and switch from the first view output mode to a second view output mode from the plurality of view output modes, and control, in response to receiving second user input, output of second views of the IVD laboratory system through the display device according to second view output control data indicative of a second set of view parameters assigned to the second view output mode, wherein the second view output mode is assigned to the (selected) method to be trained, wherein the second set of view parameters is different from the first set of view parameters.

According to some aspects, a computer-implemented training system for user-interactive training of methods performable in an IVD laboratory system is provided. The computer-implemented training system includes: one or more data processors; a memory device connected to the one or more data processors; a user interface provided with an output device having a display device and an input device configured to receive user input; and one or more software applications running on the one or more data processors and having a plurality of application modules. The plurality of application modules includes: a visualization module configured to provide a digital visualization of an IVD laboratory system, the IVD laboratory system comprising a plurality of IVD instruments designed for processing biological samples; a method module configured to provide method control data for a plurality of methods performable in the IVD laboratory system, each of the methods having assigned an ordered sequence of method steps; a view output mode module configured to provide view output control data for controlling a plurality of view output modes each assigned a set of view parameters for outputting views of the IVD laboratory system, wherein the views are generated from the digital visualization of the IVD laboratory system; and a control module configured to control user-interactive training for the plurality of methods. The plurality of application modules is further configured to: control, in response to receiving first user input, output of first views of the IVD laboratory system through the display device according to first view output control data indicative of a first set of view parameters assigned to a first view output mode from the plurality of view output modes by the control module; receive a training mode selection user input indicative of a user selection for a method to be trained from plurality of methods; switch from the first view output mode to a second view output mode from the plurality of view output modes; and control, in response to receiving second user input, output of second views of the IVD laboratory system through the display device according to second view output control data indicative of a second set of view parameters assigned to the second view output mode by the control module, wherein the second view output mode is assigned to the (selected) method to be trained, wherein the second set of view parameters is different from the first set of view parameters.

According to another aspect, a method for user-interactive training of methods performable in an IVD laboratory system by a computer-implemented training system is provided. The method includes: providing a computer-implemented training system for an IVD laboratory system including a plurality of IVD instruments designed for processing biological samples. The computer-implemented training system includes: one or more data processors; a memory device connected to the one or more data processors; a user interface provided with an output device having a display device and an input device configured to receive user input; and one or more software applications running on the one or more data processors and having a plurality of application modules. The plurality of application modules includes: a visualization module configured to provide a digital visualization of an IVD laboratory system, the IVD laboratory system including a plurality of IVD instruments designed for processing biological samples; a method module configured to provide method control data for a plurality of methods performable in the IVD laboratory system, each of the methods having assigned an ordered sequence of method steps; a view output mode module configured to provide view output control data for controlling a plurality of view output modes each assigned a set of view parameters for outputting views of the IVD laboratory system, wherein the views are generated from the digital visualization of the IVD laboratory system; and a control module configured to control user-interactive training for the plurality of methods. The method further includes: controlling, in response to receiving first user input, output of first views of the IVD laboratory system through the display device according first view output control data indicative of a first set of view parameters assigned to a first view output mode from the plurality of view output modes by the control module; receiving a training mode selection user input indicative of a user selection for a method to be trained from the plurality of methods; switching from the first view output mode to a second view output mode from the plurality of view output modes; and controlling, in response to receiving second user input, output of second views of the IVD laboratory system through the display device according to second view output control data indicative of a second set of view parameters assigned to the second view output mode by the control module, wherein the second view output mode is assigned to the (selected) method to be trained, wherein the second set of view parameters is different from the first set of view parameters.

The plurality of methods performable in the IVD laboratory system among which the method to be trained can be selected can comprise at least one of a workflow, one or more routine activities, a maintenance, and a troubleshooting.

The workflow may be indicative of at least one of a sample flow, a sample container flow, and an IVD instrument flow. The sample flow and the sample container flow may be indicative of a processing route/steps of a sample, and a sample container, respectively, processed by the IVD laboratory system. The sample/sample container flow may be indicative a path of the sample/sample container through the IVD laboratory system during processing this sample/sample container. The sample/sample container flow may be indicative of instrument-to-instrument movements. In particular, the sample/sample container flow may be indicative of instrument-to-instrument movements that require user interaction. An instrument flow can be indicative of the order in which the IVD instruments process the sample/sample container.

A routine activity may correspond to one or more interactions between the user and the IVD laboratory system (in particular, one or more modules of IVD instruments and/or instruments of the IVD laboratory system). The routine activity may be carried out regularly, for example, every day, each time one or more samples are to be displaced between different modules/instruments (e.g. in the workflow), and/or each time an IVD instrument has to be refilled or emptied, e.g., with/from samples, sample tubes, and/or pipettes.

The maintenance may also correspond to one or more interactions between the user and the IVD laboratory system, e.g., one or more IVD instruments or modules of the IVD instruments. The maintenance can be performed to maintain the quality of the IVD laboratory system (in particular, the quality of one or more modules/components of the IVD instruments and/or IVD instruments) and/or reduce the probability of failure of the IVD laboratory system, e.g. the probability of failure of one or more modules of IVD instruments and/or IVD instruments. The maintenance may occur less frequently than the routine activity. The maintenance may require more interactions than the routine activity. For example, maintenance can only be performed by a special user (trained in maintenance).

The troubleshooting may also correspond to one or more interactions between the user and the IVD laboratory system (in particular, one or more modules of the IVD instruments and/or instruments of the IVD laboratory system). The troubleshooting may be carried out for an IVD laboratory system, e.g. in particular, one or more modules of IVD instruments and/or IVD instruments, in which a trouble is present, i.e., whose quality has declined, e.g., under a predefined threshold, which run incorrectly, and/or which have completely failed. The troubleshooting may comprise one or more interactions for finding the trouble and/or one or more interactions for fixing the trouble.

The IVD laboratory system may have a plurality of IVD sample containers configured to receive one or more samples to be processed in the IVD laboratory system. The IVD sample container may be a tube. The IVD sample container(s) may be received in a rack or a puck providing for an IVD sample container holder or carrier. IVD sample container holder or carrier configured to receive one or more IVD sample containers. The IVD sample containers may be configured to receive one or more samples to be processed in the IVD laboratory system. An IVD sample container may be handled or processed by only a subset of the IVD instruments or a single IVD instrument of the IVD laboratory system.

A biological sample received in a sample container can comprise a biological material, e.g. as taken from a human body or an animal body. A biological sample can comprise a body fluid, such as blood, interstitial fluid, urine, saliva, or other types of body fluids. For simplicity, biologicals samples are herein typically only referred to as "samples".

A sample can potentially comprise at least one analyte of interest, e.g. molecules, ions, proteins, metabolites, pathogens, and the like. It is typically one of the tasks of IVD testing to detect the presence resp. absence and/or a concentration of one or more analytes in a sample. More generically, IVD testing can refer to determining a biological property of a sample. IVD testing can comprise performing at least one analytical test on a sample, wherein the analytical test can allow to draw conclusions on the biological properties of the sample. The analytical test can e.g. comprise adding a reagent to the sample, a possible detectable reaction of the sample with the reagent, and/or a detecting or non-detection of this reaction. Detecting of an reaction can e.g. comprise measuring a physical value of the sample (resp. a composite obtained by using the sample such as a sample-reagent mixture), such as a spectrum and/or an intensity of a radiation reflected by and/or transmitted through the sample (resp. the composite obtained by using the sample).

Processing a sample can e.g. comprise transporting the sample (typically in IVD sample containers such as IVD tubes; the IVD sample containers may be held in IVD sample container holders such as IVD tube racks), performing pre-analytical steps on the samples (e.g. preparatory steps such as centrifuging), performing analytical steps on the samples (e.g. adding a reagent to the sample and measuring the reaction of the sample with the reagent), and/or performing post-analytical steps on the samples (e.g. storing of a sample in a refrigerator for later use).

The IVD laboratory instrumentation comprises one or more IVD laboratory instruments designed for processing samples, e.g. for performing one or more steps of an intended work-flow on the sample. Processing a sample can comprise one or more physical processing steps (e.g. moving, mixing, heating, etc.). IVD laboratory instruments can comprise instrument hardware for processing samples (e.g. gripper, reagent storage, pipetting apparatus, heating element, etc.) as well as instrument software designed for operating the instrument hardware. An IVD laboratory instrument can comprise a control unit designed for controlling, in particular steering, the operation of the instrument hardware, wherein the instrument software can be designed for being executed using the control unit.

The IVD laboratory instruments are typically categorized according to the different type of sample processing steps they can perform. A transport IVD laboratory instrument is designed for transporting samples (resp. the IVD sample containers and/or respective sample container holders), e.g. from one IVD laboratory instrument to another. A pre-analytical IVD laboratory instruments is designed for performing pre-analytical steps on the samples. A analytical IVD laboratory instrument is designed for performing analytical steps (such as an analytical test) on the samples; an analytical IVD laboratory instrument can comprise a digital analytical IVD laboratory instrument designed for performing analytical computation steps (e.g. a medical algorithm). A post-analytical IVD laboratory instrument is designed for performing post-analytical steps on the samples. Some IVD laboratory instruments are capable of performing multiple type of sample processing steps, e.g. pre-analytical and analytical steps.

In an example, the IVD laboratory instrumentation comprises two pre-analytical IVD laboratory instruments, five analytical IVD laboratory instruments, one post-analytical IVD laboratory instruments, and one transport IVD laboratory instruments, wherein the IVD laboratory instrumentation is designed such that the one transport IVD laboratory instruments connects all the other IVD laboratory instruments.

The IVD laboratory system may comprise a transport system configured to transport the IVD sample containers in the IVD laboratory system. The transport system may be configured to transport the IVD sample containers along the IVD sample container flow. The transport may be fully or substantially automated. The transport system may be supported by user interactions. At least along a section of the IVD sample container flow, the user can transport the IVD sample container. This user transport can be a routine activity.

On the basis of the user-interactive training controlled or provided by the control module according to the user selection, one or more trainees can perform the provided user-interactive training.

By default, an initial view of the IVD laboratory system can be a view from the plurality of first views and can be output through the display device. The initial view may be output prior to controlling the output of the first views of the IVD laboratory system. In response to the receiving of the training mode selection user input, another initial view of the IVD laboratory system can be output through the display device, wherein the other initial view can be a view from the plurality of second views. Outputting the other initial view may be comprised by the switching from the first view output mode to the second view output mode. The other initial view may be output prior to controlling the output of the second views of the IVD laboratory system.

The view may be an overview, showing (e.g. essentially) the entire IVD laboratory system. Alternatively, the view may correspond to a neutral position in front of a certain instrument which may be referred to as instrument or system view. Alternatively, the view may be a detailed view corresponding to a part of the certain IVD instrument. The detailed view may correspond to an information and/or an interactive step button. The detailed view and/or the system view may be comprised by the second views. The overview may be comprised by the first views. Optionally, the first views may also comprise at least one system view. The second views may not comprise the overview. The first views may not comprise detailed views.

At least one of the first views may comprise a marker indicative of the workflow of an IVD sample container. The marker can be a line, for example, a colored line. The line may be indicative of the path of the IVD sample container trough the IVD laboratory system. The line can lead from instrument to instrument. The path of the IVD sample container in the instruments can be neglected. The line can be in the foreground. A highlighted analyzer may be indicative of the location of the IVD sample container. For such a highlighting, a visual representation of the IVD sample container may be displayed above the corresponding IVD instrument. The IVD sample container flow may comprise sub-flows. A sub-flow may be, for example, a flow of the IVD sample container through the system for the purpose of analyzing the IVD sample container (IVD sample container workflow), a flow of the IVD sample container through the system for the purpose of (e.g. daily) archiving the IVD sample container (IVD sample container (e.g. daily) archive flow), a flow of the IVD sample container through IVD laboratory system for the purpose of archiving/removing the IVD sample container (IVD sample container archive flow), and a flow of a part of the IVD sample container (aliquod) through the IVD laboratory system (aliquod flow). The different sub-flows may be assigned to different colors. Inactive sub-flows may be indicated may, e.g. be graying out. The IVD sample container flow may comprise flows inside an automation line and flows outside the automation line. Flows outside the automation line may be carried out by the user. The flows outside the automation line may be assigned to dashed lines.

By means of one or more of the modules from the plurality of application modules, the plurality of application modules may configured to control operation of the computer-implemented training system, such operation comprising applying the first and second view output mode. In an embodiment, the control module, alone or in combination with at least one of the other modules from the plurality of application modules, is configured to process the view output control data and control output of first and second views of the IVD laboratory system.

The method module may be connected to a method storage device, for example, comprised by the memory device. The method storage device may store method control data for the plurality of methods performable in the IVD laboratory system. The method module can be in data connection with one or more of the other modules of the system, e.g. for exchanging data. The method storage device may store data indicative of visual representation of the plurality of methods performable in the IVD laboratory system. The method module may be a program on a main processor, wherein the main processor may comprise one of the one or more data processors). Alternatively, the method module may be a program on a processor that is remote from the main processor, wherein the processor may comprise one of the one or more data processors.

The plurality of methods may comprise one or more workflows, one or more routine activities, one or more maintenance methods, and/or one or more troubleshooting methods performable in the IVD laboratory system. For example, the workflow may refer to an IVD sample container workflow indicative of workflow steps conducted for or by the IVD sample container in the IVD laboratory system while handling the IVD sample container in the IVD laboratory system for processing a sample received in the IVD sample container. One or more methods of the plurality of methods may comprise method steps, for example, workflow steps, routine activity steps, maintenance steps, and/or troubleshooting steps.

The sequence of method steps may be provided as an ordered sequence of method steps. In the ordered sequence, the method steps may be ordered according to the sequence in which they are to be carried out or conducted. A chronological order may be provided. For example, the chronological ordered views may be indicative of views of a plurality of steps to be conducted in a chronological order when performing the method to be trained in IVD laboratory system, i.e. in a real world IVD laboratory system.

The view output mode module may define what is to be output via the visualization module. In particular, the view output mode module can limit the views that are displayable on the display device via the visualization module. For different limitations, the view output mode module can provide different view output modes. The choice of view output mode can be made in response to user input. The view output mode module can be in data connection with one or more of the other modules of the system, e.g. for exchanging data. The view output mode module may be a program on a main processor, wherein the main processor may be provided with one of the one or more data processors. Alternatively, the view output mode module may be a program on a processor that is remote from the main processor, wherein the processor may comprise one of the one or more data processors.

The plurality of view output modes may correspond to a plurality of (e.g. different) limitations that limit the views that are displayable on the display device via the visualization module. For example, if a first view output mode is provided, only views that show an overview of the IVD laboratory system may be allowed. If the second view output mode is provided, only views that show a detailed view of one or more IVD instruments may be allowed.

The set of view parameters may define the limitation of the corresponding view output mode. For example, the set of view parameters may be indicative of a plurality of allowed camera perspectives for which view may be provided from the digital visualization of an IVD laboratory system, which may be a 3-dimensional digital visualization of an IVD laboratory system.

The control module which may also be referred to as training (control) module may at least in part provide an interface between the user, e.g. via the user interface, and the other modules of the training system. Via the control module, user input may be received. The user interface may comprise a user input device such as a mouse, keyboard, touchscreen, joystick, gamepad, microphone, and/or camera. The control module can be in data connection with one or more of the other modules of the system, e.g. for exchanging data. The control module may be a program on a main processor, wherein the main processor may comprise one of the one or more data processors. Alternatively, the control module may be a program on a processor that is remote from the main processor, wherein the processor may be one of the one or more data processors.

The first views may show a three-dimensional representation of the IVD laboratory system. The first views may comprise (or be defined by) overviews of the IVD laboratory system. Overviews may show the entire IVD laboratory system. Overviews may be two-dimensional. Overviews may show the IVD laboratory system from above. Alternatively, the first views may correspond to user perspective views of the IVD laboratory system. Via the first views, it can be suggested to the user that he is moving in the digital visualization of an IVD laboratory system (virtual representation of the IVD laboratory system.

Via the training mode selection user input, the user can select one of the plurality of methods performable in the IVD laboratory system. In particular, the user can select a method from the plurality of methods performable in the IVD laboratory system that he or she wants to train.

Receiving user input may correspond to receiving a signal from the user input device in response to an interaction of the user with the user input device.

By the second set of view parameters, the second view output mode may be configured to prevent outputting one or more of the first views of the IVD laboratory system allowed for output in response to (first) user input by the first set of view parameters in the first view output mode.

However, one or more of the first views may be allowed. That is, by the second set of view parameters, the second view output mode may be configured to (only) prevent outputting a subset of the first views of the IVD laboratory system allowed for output in response to (first) user input by the first set of view parameters in the first view output mode. In particular, the second view output mode may be configured to allow outputting first views facing (one or more sections of) one or more IVD instruments of the IVD laboratory system associated with the (selected) method to be trained. These second views can also be allowed even if one or more of these second views match one or more of the first views of the IVD laboratory system allowed for output in response to (first) user input by the first set of view parameters in the first view output mode.

From the one or more of the first views of the IVD laboratory system allowed for output in response to first user input by the first set of view parameters in the first view output mode, exclusively the ones facing (one or more sections of) one or more IVD instruments of the IVD laboratory system associated with the (selected) method to be trained may be allowed.

In this context, a view facing/directed at a particular object can be understood as a view in which the focus point is on that object. In this case, the particular object can be located in the center of the view.

By the second set of view parameters, the second view output mode may be configured to limit the output of second views to views that show the IVD laboratory system IVD instrument associated with the selected method to be trained from a particular direction(s), for example, from the front, from the top, from the back, from the inside, and/or from the viewing direction of a user standing (in a working position) in front of the instrument.

By the first set of view parameters, the first view output mode may be configured to provide, in response to receiving (first) user input, multi-dimensional views of the plurality of IVD instruments from the visualization of the IVD laboratory system.

The first views may comprise an initial first view of the plurality of first views and a following first view from the plurality of first views. Likewise, the second views may comprise an initial second view and a following or subsequent second view from the plurality of second views. The initial first view can have a first focal point, and the following first view can have a second focal point, wherein the first and second focal points are different. Focal points of second views may be different or not be different. Focal points of second views may lie on (one or more sections of) one or more IVD instruments of the IVD laboratory system associated with the (selected) method to be trained. The initial first view from the plurality of first views may start from a first point (in three-dimensional space), and following first view may start from a second point (in three-dimensional space), the first and second points being different.

An initial first view of the plurality of first views may direct in a first direction (in three-dimensional space), and a following first view of the plurality of first views may direct in a second direction (in three-dimensional space), the first and second directions being different.

An initial first view of the plurality of first views may correspond to a first zoom, and a following first view of the plurality of first views may correspond to a second zoom, the first and second zooms being different. Alternatively, the zoom for the plurality of first views may be fixed (remain unchanged).

In an embodiment, the first views may be provided with six degrees of freedom, namely three translational degrees of freedom, and three rotational degrees of freedom. In addition, zoom degree may be rendered. The degrees of freedom of the first views can be limited to the six degrees of freedom, namely three translational degrees of freedom and three rotational degrees of freedom. Alternatively, the degrees of freedom of the first views can be limited to a number of degrees of freedom smaller than six, e.g. five or four degrees of freedom. Only first views showing at least a part of the IVD laboratory system may be allowed.

In response to receiving (first) user input, the first view output mode may be configured to provide multi-dimensional views of the plurality of IVD laboratory (system) IVD instruments that simulate walking through the IVD laboratory system. Via (first) user input, first views can be output in such a way that the user gets the impression of moving in a virtual model of the IVD laboratory system via user input(s).

By the first set of view parameters, the first view output mode may be configured to limit the output of first views to views that show the IVD laboratory system (such as IVD instrument or IVD instrument component) from a particular direction(s), for example, from the top. In particular, the first view output mode may be configured to limit the output of first views to views starting from the same height above (the floor of) the IVD laboratory system (in this case, the zoom may be fixed). In addition, the view direction can be limited to a certain direction in the three-dimensional space.

For training of the method, by the second set of view parameters, the second view output mode may be configured to limit output of views, in response to receiving (second) user input, to multi-dimensional views of one or more IVD instruments, e.g. a single instrument, from the plurality of IVD instruments, the one or more IVD instruments being assigned to the sequence of method steps of the method to be trained.

The second view output mode may be configured to limit the output of views to multi-dimensional views of one or more IVD instruments, the one or more IVD instruments being assigned to the ordered sequence of method steps of the method to be trained. The second view output mode may be configured to limit the output of views to multi-dimensional views of one or more sections of the one or more IVD instruments being assigned to the sequence of method steps of the method to be trained. The second view output mode may be configured to limit the output of views to an ordered sequence of multi-dimensional views of (one or more sections of) the one or more IVD instruments being assigned to respective method steps of the sequence of method steps of the method to be trained. For each method step, another limit for the output of views may apply. The second view output mode may be configured to limit the output of views to first multi-dimensional views of (one or more sections of) the one or more IVD instruments being assigned to a first method step of the sequence of method steps of the method to be trained (first limitation). The second view output mode may be configured to limit the output of views to second multi-dimensional views of (one or more sections of) the one or more IVD instruments being assigned to a second method step of the sequence of method steps of the method to be trained (second limitation). The second method step may be different from the first method step. The second limitation may be different from the first limitation. The allowed multi-dimensional views corresponding to the second limitation may be different from the allowed multi-dimensional views corresponding to the first limitation. The second method step may be downstream of the first method step in the ordered sequence of method steps of the method to be trained. A switch from the first limitation to the second limitation can be made in response to user input. A switch from the second limitation to the first limitation may not be allowed.

The second views may comprise a plurality of second views, showing the user how to use the IVD laboratory system/IVD instrument. The training system for user-interactive training can be provided for training several users, e.g. about 15 users. The display device can be one (e.g. television) screen. Alternatively, the display device can comprise several screens spaced apart from each other. One screen can be assigned to a single user. Alternatively, one screen can be assigned to several users. A smartphone (of a user) can serve as the screen. The user input may be carried out by a specific user, for example, a trainer. The other users may be trainees. It is noted that also the trainer can be a trainee.

The computer-implemented training system may further comprise assigning a camera position selectable by user input to each view generated from the visualization of the IVD laboratory system.

The camera position may define the position of the camera in three-dimensional space and optionally additionally the spatial orientation (rotational orientation) of the camera in three-dimensional space. The camera position can define the starting point of a corresponding view and the direction of the corresponding view. In particular, the position of the camera in three-dimensional space can define the starting point of the corresponding view and the spatial orientation of the camera in three-dimensional space can define the direction of the corresponding view. By only changing the camera position (and not its zoom), the degree of freedom of the user-selectable views can be limited to six degrees of freedom.

The controlling of the output of first/second views by (first/second) user input may comprise controlling the camera position by (first/second) user input. For each view, a respective camera position can be selected by the user (via (first/second) user input). The first set of view parameters assigned to the first view output mode may comprise a first set of camera positions. In particular, the first set of view parameters assigned to the first view output mode may comprise a first set of allowed camera positions corresponding to allowed first views. The second set of view parameters assigned to the second view output mode may comprise a second set of camera positions. In particular, the second set of view parameters assigned to the second view output mode may comprise a second set of allowed camera positions corresponding to allowed second views.

This user input may be indicative of the position of the user (in the IVD laboratory system). In reaction to this input, the camera position for each view generated from the visualization of the IVD laboratory system may be fixed (e.g., in the Cartesian coordinate system, x-, y-, and z-coordinates may be fixed), in particular may be set to the position of the user (e.g., to the position of the head of the user). The rotational degrees of freedom of the camera can remain unaffected by this position fixation. The camera fixation can be provided especially for the second views (and does not have to be provided for the first views). If the camera position for the second views is fixed, the user can freely rotate (three rotational degrees of freedom) the camera according to user input for the second views (especially around each of the three spatial axes). This applies accordingly to the first views. Alternatively, starting from the fixed camera position (in space), the camera can be oriented (rotationally) in such a way that the camera points to the location of the (selected) method to be trained. In particular, the camera can point sequentially to the individual method steps of the (selected) method to be trained.

By the first set of view parameters, the first view output mode may be configured to provide, in response to receiving (first) user input, first multi-dimensional views generated from the visualization of the IVD laboratory system, wherein a first set of camera positions allowed for the first view output mode is assigned to the first multi-dimensional views.

The allowed first set of camera positions may comprise (be defined by) positions of the camera in three-dimensional space that are assigned to user positions in the IVD laboratory system (in particular, to the positions of the head of the user). In this case, at each allowed position in three-dimensional space, all spatial orientations of the camera in three-dimensional space may be allowed. One or more zoom settings may be allowed. Only one zoom (setting) may be allowed.

The allowed first set of camera positions may comprise (be defined by) positions of the camera in three-dimensional space that are assigned to a certain height above (the floor of) the IVD laboratory system (in particular, to the height of the head of the user). In this case, at each allowed position in three-dimensional space, all spatial orientations of the camera in three-dimensional space may be allowed. One or more zoom settings may be allowed. Only one zoom setting may be allowed.

The allowed first set of camera positions may comprise (be defined by) positions of the camera in three-dimensional space that are assigned to a certain height above (the floor of) the IVD laboratory system, wherein the position of the camera is far above the IVD laboratory system. The position far above the IVD laboratory system may correspond to a position whose height above (the floor of) the IVD laboratory system is a multiple of the height of the IVD laboratory system. Alternatively, the position far above the laboratory can correspond to a position in which the camera can provide views that show several and/or all IVD instruments. In this case, at each allowed position in three-dimensional space, only one orientation of the camera in three-dimensional space may be allowed. One or more zoom settings may be allowed. Only one zoom setting may be allowed.

For training of the method, by the second set of view parameters, the second view output mode may be configured to provide, in response to receiving (second) user input, second multi-dimensional views generated from the visualization of the IVD laboratory system, wherein a second set of camera positions allowed for the second view output mode being different from the first set of camera positions is assigned to the second multi-dimensional views.

Although the second set of camera positions allowed for the second view output mode are different from the first set of camera positions, one or more allowed second camera positions may equal one or more first camera positions. Alternatively, the second set of camera positions allowed for the second view output mode may be entirely different (different in pairs) from the first set of camera positions.

Allowed second multi-dimensional views may be assigned to the allowed second set of camera positions. Allowed second multi-dimensional views may comprise (or be defined by) views that show a specific IVD instrument and/or a specific IVD instrument component or module. The specific IVD instrument may be an IVD instrument that is assigned to the (selected) method to be trained. The specific IVD instrument may be an IVD instrument that has been selected by the user, for example, via user input during first view output mode. In particular, this selection may be a selection of the user (via user input) in one of the first output views, for example, via mouse click on the specific IVD instrument in one of the first output views.

The allowed second set of camera positions may comprise (be defined by) positions of the camera in three-dimensional space that are assigned to user positions in the IVD laboratory system, e.g. to the positions of the head of the user. The allowed second set of camera positions may comprise (be defined by) positions of the camera in three-dimensional space that are assigned to a space area in the IVD laboratory system in front of the specific IVD instrument, e.g. in front of the IVD instrument that is assigned to the (selected) method to be trained). In addition or alternatively, the allowed second set of camera positions may comprise (or be defined by) positions of the camera in three-dimensional space that are located within the specific IVD instrument.

For the second set of allowed camera positions, the zoom (settings) and/or spatial orientation (rotational orientation) of the camera in three-dimensional space may be fixed. In this case, such a fixation can mean that the same zoom and/or the same rotational orientation are provided for all camera positions of the second set of allowed camera positions. Alternatively, such fixation may mean that the zoom and/or the rotational orientation are fixed for the respective camera positions of the second set of allowable camera positions. In the latter case, zoom and/or rotational orientation of the camera may differ in different allowed second camera positions. In particular, for the second set of allowed camera positions, the camera can always be directed at (one or more sections of) the specific IVD instrument.

The second set of camera positions allowed for the second view output mode may be configured to limit the second set of camera positions to a plurality of camera positions around a fixed focal point assigned to the method to be trained.

The focal point may correspond to a specific section of the IVD instrument where interaction with the user is required. Alternatively, the focal point may correspond to a specific section of the IVD laboratory system or IVD instrument that is assigned to one of the processing steps of the workflow.

The focal point may be a point at which the camera is directed to. The focal point may be located in the center of a view corresponding to a camera that is directed to the focal point. For the plurality of camera positions around the fixed focal point, the cameras may be directed to the focal point. The focal point can be a point on which the camera focuses. For the plurality of camera positions around the fixed focal point, the camera may focus on the focal point.

The computer-implemented training system may further comprise assigning the fixed focal point to an IVD instrument from the plurality of IVD instruments, wherein the method to be trained is to be performed at least in part with the IVD instrument. If a fixed focal point is provided, the three rotational degrees of freedom of the views/camera can be eliminated.

The plurality of application modules may further be configured to provide, for controlling the output of the first views in the first view output mode, a free view output mode assigned a set of free view parameters configured to output, in response to user input, a non-ordered sequence of views. In some embodiments, the non-ordered sequence of views is not restricted to the any particular sequence of IVD method steps.

A free view output mode/free view parameters may output any (physically possible) view. The user can select the view by means of user input. In this case, the camera perspective assigned to the view, i.e., in particular the viewing position in three-dimensional space and/or the viewing direction and/or the zoom, can be freely selectable.

Alternatively, for the first and/or the second views amendment of the camera perspective assigned to a present view (for selecting additional views) by user input may be allowed for different sets of degrees of freedom depending on the view output mode applied. For example, a set of all six degrees of freedom (3× linear movement and 3× rotational movement) may be applied in the first view output mode. In the second view output mode, the camera perspective may be bound or fixed to a local point or area, for example a local point assigned to an IVD instrument which may be selected by the user and which is assigned to the training method conducted, may only allow for rotational degrees of freedom. It may be allowed to change the local point or area.

The plurality of second views may comprise a first group of second views assigned to a first view level and a second group of second views (different from the first group) to a second view level which is different from the first view level, wherein the first group of second views is assigned at least a first common view parameter and the second group of second views is assigned at least a second common view parameter which is different from the first common view parameter. With respect to the first group of second views, each second view of the first group of second views is assigned at least the first common view parameter which is common to all second views from the first group. With respect to the second group of second views, each second view of the second group of second views is assigned at least the second common view parameter which is common to all second views from the second group. Thus, the second views are categorized based on the common view parameter(s).

The second views assigned to the first or second view level or view category are distinguished (or categorized) at least based on the common view parameter. The first common view parameter is common to all second views of the first group of second views, and the second common view parameter is common to all second views of the second group of second views. A plurality of view parameters may be common to the second views assigned to a group of second views.

In this example, the plurality of second views comprises second views assigned to different view levels or view categories. For example, the second views assigned to one of the view levels, such second views assigned establishing a group, may have assigned a common set of second view parameters. In an example, different view levels may be distinguished based on the number of degrees of freedom assigned to the second views. Second views of a first view level may be assigned six degrees of freedom with respect to amending a camera perspective in response to user input. Second views assigned to a second view level may be assigned less than six degrees of freedom with respect to amending a camera perspective in response to user input, for example, only four degrees of freedom.

Further, the different view levels or view categories may be assigned one or more second views. For example, a view level characterized by or assigned to a focal point with respect to the camera perspective may be assigned a plurality of second views which can be output in response to user input amending, regarding camera position, one or more of the rotational degrees of freedom and/or a zoom degree of freedom (but, with fixed focal point). Thus, for the second views assigned to the view level (and characterized by the fixed focal point being a common view parameter) different second views are available depending on the user defined rotational and/or zoom.

Second views assigned a focal point may also be referred to focal views. Different focal views may provide for different view levels or view categories each assigned a plurality of second views (group of second views) for different camera perspective regarding rotational degrees of freedom.

The training system may be configured to switch from a first view level to a second view level in reaction to user input, e.g. user interaction with an interactive step button.

The plurality of application modules may further be configured to provide, for controlling the output of the second views in the second view output mode for training of the method, an ordered view output mode assigned an ordered set of view parameters configured to interactively outputting an ordered sequence of second views of the method steps of the method selected by training mode selection user input.

Interactively outputting an ordered sequence of (second) views may correspond to outputting an ordered sequence of views in response to user input. In particular, interactively outputting an ordered sequence of views may correspond to outputting an ordered sequence of views in response respective subsequent user inputs. In response to user input (first second user input or user selection input), a first view of the plurality of second views of the ordered sequence of views may be output. In response to user input (second user input), another view of the plurality of second views of the ordered sequence of views may be output. The view of the plurality of second views output before may be different from the other view of the plurality of second views. In the ordered sequence of views, the other view of the plurality of second views may be downstream of the view of the plurality of second views. By (e.g. interactive) user input, it can be chosen between second views assigned to different method steps of the method selected by training mode selection user input. For example, only such a second view of the ordered sequence of views can be output by user input, which is (e.g. directly) downstream of the currently shown second view. Alternatively or in addition, the ordered sequence of views of the method steps of the method selected by training mode selection user input may automatically be output one after the other, e.g. in response to such user selection input. According to another example, only such second views of the ordered sequence of views can be output by user input, which are either (e.g. directly) upstream or downstream of the currently shown second view.

A first view of the plurality of second views of the ordered sequence of views may be the initial second view. The first view of the plurality of second views of the ordered sequence of views may be output in response to receiving the training mode selection user input indicative of a user selection for a method to be trained from the plurality of methods.

The user input required for changing between second views of the ordered sequence of views may be a certain user input, in particular a user input in the currently output second view. For example, this user input may comprise (or be defined by) clicking, e.g., per mouse or touch screen, on a certain symbol, e.g., an arrow, a circle, or a ring. The certain symbol may be an interactive step button.

For controlling the output of the second views in the second view output mode for training of the method, the plurality of application modules may further be configured to: present an interactive step button within the second views, and switch from a present second view comprising presentation of the interactive step button to a following second view in response to receiving user input for selecting the interactive step button through the input device, wherein the present second view and the following second view are assigned to consecutive method steps of the ordered sequence of method steps of the method to be trained.

In each second view, one or more interactive step buttons may be provided. The interactive step button may be located (in the currently output second view) on the fixed focal point assigned to the following method step. The interactive step button may be located (in the currently output second view) on a specific section of the IVD instrument where interaction with the user is required during the following method step.

The selection of the interactive step button may trigger an animation. Additionally, in response to the selection of the interactive step button, information (such as text) data may be displayed, for example, next to the interactive step button and/or in a predefined section of the display, e.g. an information box. The animation may be comprised by a set of second views.

The plurality of application modules may further be configured to: present at most (e.g. exclusively/exactly) one interactive step button within the second views; or present at most one interactive step button within second views assigned to method steps prior to a final method step of the consecutive method steps.

The plurality of application modules may be configured to present no or more than one interactive step button within a second view assigned to the final step of the consecutive method steps.

For controlling the output of the second views in the second view output mode for training of the method, the plurality of application modules may further be configured to: present an interactive information button within the second views, and output information data through the display device in response to receiving user input for selecting the interactive information button through the input device.

On or more interactive information buttons may be presented within one second view/the second views. The information data may comprise information text data. The information data may be presented next to the selected interactive information button. Alternatively, the information data may be presented in a predefined section on the display device. In the second view/the second views, the interactive information button(s) may be located on a displayed section (or sections) of the IVD laboratory system/of the IVD instrument for which corresponding information are stored/information data can be output.

For this user input and/or for other user inputs of the present disclosure, the following may be provided. The user input may comprise a mouse click, a touch on a touch screen, a voice command, a gesture command, a click on a keyboard, and/or a joystick input.

In response to the selection of the information button, the view may change to a detailed view of the corresponding section of the IVD laboratory system. The detailed view can be comprised by the second views.

The views generated from the digital visualization of the IVD laboratory system may comprise hidden section views representing views of a hidden section of the IVD instrument from the plurality of IVD instruments, the hidden section being covered by a hiding section of the IVD instrument in a first view and uncovered in a hidden section view.

The hiding section may be a section of the IVD laboratory system or one or more IVD instruments. For example, the hiding section may be a housing section of the IVD laboratory system or one or more IVD instruments. In particular, the hiding section may be a part of one of the IVD instruments that is (reversibly) relocatable. For example, the hiding section can be a lid, a door, or a drawer of one of the IVD instruments. In the uncovered view, the lid, the door, or the drawer can be opened. Alternatively or in addition, the hiding section may be a section (in the laboratory) that is not comprised by the IVD laboratory system. The uncovered view may comprise a cutaway view of the IVD laboratory system or one or more IVD instruments. The uncovered view may show an interior of the IVD laboratory system or one or more IVD instruments. The interior of the IVD laboratory system or one or more IVD instruments may be comprised by the hidden section.

The first view, in this context, may be comprised by the first views assigned to the first view output mode. The hidden section view may be comprised by the second views assigned to the second view output mode. The uncovering may take place during the switching from the first view output mode to the second view output mode.

The computer-implemented training system may further comprise, in response to receiving user input, uncovering the hidden section and outputting a hidden section view representing the hidden section through the display device.

This user input can correspond to the selection user input indicative of a user selection for a method to be trained from the plurality of methods. The system may further comprise, uncovering sections of the IVD laboratory system or one or more IVD instruments that (initially are covered and) are assigned to the (selected) method to be trained.

The computer-implemented training system may further comprise providing a digital visualization of an IVD laboratory system configured to operate for at least one of pre-analytics, analytics, and post-analytics.

The digital visualization may be an animation of the operation of the IVD laboratory system. The digital visualization may be comprised by the first views and/or the second views. The digital visualization may show the IVD sample container flow, in particular the IVD sample container flow in one of the IVD instruments.

By the first set of view parameters, the first view output mode may be configured to provide, in response to receiving (first) user input, holistic views of the plurality of IVD instruments from the visualization of the IVD laboratory system.

The holistic views may correspond to views from above the IVD laboratory system. In particular, the holistic views may correspond to a bird's eye views. In one or more holistic/first views, the workflow may be illustrated, for example, via lines which may be colored.

The plurality of application modules may further be configured to provide, for the output of the second views in the second view output mode for training of the method, a chronologically ordered sequence of second views assigned to different processing times of the IVD laboratory system, each second view from the chronologically ordered sequence showing a marker in the IVD laboratory system indicative of the (e.g. time-dependent) position of an IVD sample container to be processed by the IVD laboratory system. This provides for an embodiment of the ordered view output mode.

In this context, interactively outputting an ordered sequence of second views may correspond to outputting an ordered sequence of views in response to user input. In particular, interactively outputting an ordered sequence of views may correspond to outputting an ordered sequence of views in response to respective subsequent user inputs. In response to a first user input, a view of the (e.g. chronologically) ordered sequence of second views can be output, which is subsequent to the currently output view in the ordered sequence. In response to a forward user input, a further view of the (e.g. chronologically) ordered sequence of second views can be output that is (e.g. immediately) downstream of the currently output view in the ordered sequence. In response to a backward user input, another view of the (chronologically) ordered sequence of second views can be output that is (e.g. immediately) upstream of the currently output second view in the chronologically ordered sequence. Successive views of the ordered sequence may be indicative of the movement of an IVD sample container from IVD instrument to IVD instrument. One or more of the second views of the chronologically ordered sequence may comprise information assigned to the respective processing time of the IVD laboratory system, such a workflow step. The second views may show the entire route of the IVD sample container in the IVD laboratory system, e.g. colored lines, only instrument-to-instrument moves, but not moves within IVD instruments. One or more involved IVD instruments can be marked (e.g. colored). By user input, it can be chosen between first views assigned to different workflow steps.

A view from ordered sequence of second views may correspond to the initial view from the plurality of second views. The initial view may be output prior to controlling the output of second views. The initial view of the plurality of second views of the (e.g. chronologically) ordered sequence may be output after starting the training system.

The user input required for changing between second views of the ordered sequence may be some specific user input, e.g. a user input in the currently output view. For example, this user input may comprise (or be defined by) clicking, e.g., per mouse or touch screen, on a certain symbol, e.g., an arrow, a circle, or a ring. The certain symbol may be an interactive step button.

The ordered sequence of second views may comprise different second views in which different IVD instruments are selectable. The second views may be ordered in accordance with the workflow. In second views of the plurality of second views, one or more IVD instruments assigned to first workflow steps may be selectable. In subsequent second views from the plurality of second views, one or more IVD instruments assigned to subsequent workflow steps may be selectable.

The plurality of application modules may further be configured to provide, for controlling the output of the second views in the second view output mode for training of the method, a second ordered view output mode assigned a second ordered set of view parameters configured to (interactively) output a chronologically ordered sequence of second views assigned to different processing times of a certain IVD instrument, each second view showing a processing state of the certain IVD instrument. This provides for a further embodiment of the ordered view output mode. These second views from the chronologically ordered sequence can correspond to different processing states of the IVD instrument. In particular, the second views can correspond to different workflow states. It is noted that also the second views from the chronologically ordered sequence can comprise one or more interactive information buttons. The one or more interactive information buttons may comprise, for example, the symbol "i" and, optionally, an index numbering the one or more interactive information buttons.

The receiving of the training mode selection user input may comprise receiving a user input indicative of a user selection of a first IVD instrument from the plurality of IVD instruments, and switching from the first view output mode to the second view output mode in response to the receiving the user selection, wherein the second views correspond to the first IVD instrument identified by the user selection, i.e. the second views showing the first IVD instrument at least in part.

Within the first view output mode and/or the second output mode, representations of one or more IVD instruments may be provided. One or more of these representations may be selectable by user input. The one or more representations may be highlighted, for example, by a color (e.g., blue). Also tables and/or entire workstations comprising one or more IVD instruments can be highlighted.

At least one of the plurality of first views and the plurality of second views may comprise a non-accessible view representing a view provided from the digital visualization of an IVD laboratory system and showing an aspect of the IVD laboratory system not available or not accessible by the user in a real word IVD laboratory system which corresponds to the IVD laboratory system for which the digital visualization is provided. Thus, the user would not be able to have visual access to the aspect in the real word IVD laboratory system, such aspect, for example, referring to some space or subspace provided in the IVD laboratory system.

A digital or data rendering process may be applied in at least one of the first view output mode and the second view output mode for providing the different views from the digital visualization of an IVD laboratory system. If, in response to user input, views are continuously or essentially continuously outputted, the rendering may be applied as (almost) continuous rendering process.

For the method for user-interactive training of methods performable in an IVD laboratory system by a computer-implemented training system, the embodiments described above in connection with the computer-implemented training system may be provided accordingly.

FIG. 1 shows a graphical representation of an embodiment of the computer-implemented training system 1 for user-interactive training of methods performable in an IVD laboratory system 40. The illustrated system 1 comprises a main data processor 2, a memory device 3, a user interface 4, and software applications running on the main data processor 2. The memory device 3 is connected to the main data processor 2. The user interface 4 is provided with an output device 5 having a display device 11 and an input device 6 configured to receive user input. The main data processor 2 provides a plurality of application modules 7, 8, 9, 10. In particular, the main data processor 2 provides the following application modules 7, 8, 9, 10: a visualization module 7 configured to provide a digital visualization of an IVD laboratory system 40, a method module 8 configured to provide a plurality of methods performable in the IVD laboratory system 40, each of the methods having assigned an ordered sequence of method steps, a view output mode module 9 configured to provide a plurality of view output modes each assigned a set of view parameters for outputting views of the IVD laboratory system 40, wherein the views are generated from the digital visualization of the IVD laboratory system 40, and a control module 10 which may also be referred to as training module and which is configured to provide or control user-interactive training for the plurality of methods.

The control module 10 is connected to the input device 6. The control module 10 may be the interface between the processor's calculation of the views/images to be output and the user input/input device 6. The control module 10 can forward the signals indicative of the user input to the other modules of the processor 2.

The visualization module 7 is connected to the output device 5. The visualization module 7 may covert the data provided by the other modules of the processor 2 in such a way that the display device 11 can output them as views/images. In particular, the visualization module 7 may covert the data provided by the view output mode module 9, e.g., in displayable data.

The method module 8 is connected to the memory device 3. The plurality of methods performable in the IVD laboratory system 40 may be stored in the memory device 3. The method module 8 may access this stored plurality of methods and pass it on to the other modules.

For example, the control module 10 may receive a signal corresponding to user input indicative of a specific method of the methods performable in the IVD laboratory system 40. The control module 10 may forward this signal to the method module 8. In response, the method module 8 accesses the memory device 3 and provides the processor 2 with method data indicative of the specific method. In particular, the method module 8 may send the method data to the view output mode module 9. The view output mode module 9 can then perform pre-calculations and set certain limits for the view/image to be output. The data calculated in the view output mode module 9 is then sent to the visualization module 7. The visualization module 7 can be a graphics card. The visualization module 7 converts the provided data into data that can be output by the output device 5, in particular the display device 11. The data are then transmitted to the output device 5 having the display device 11.

Figure 2:
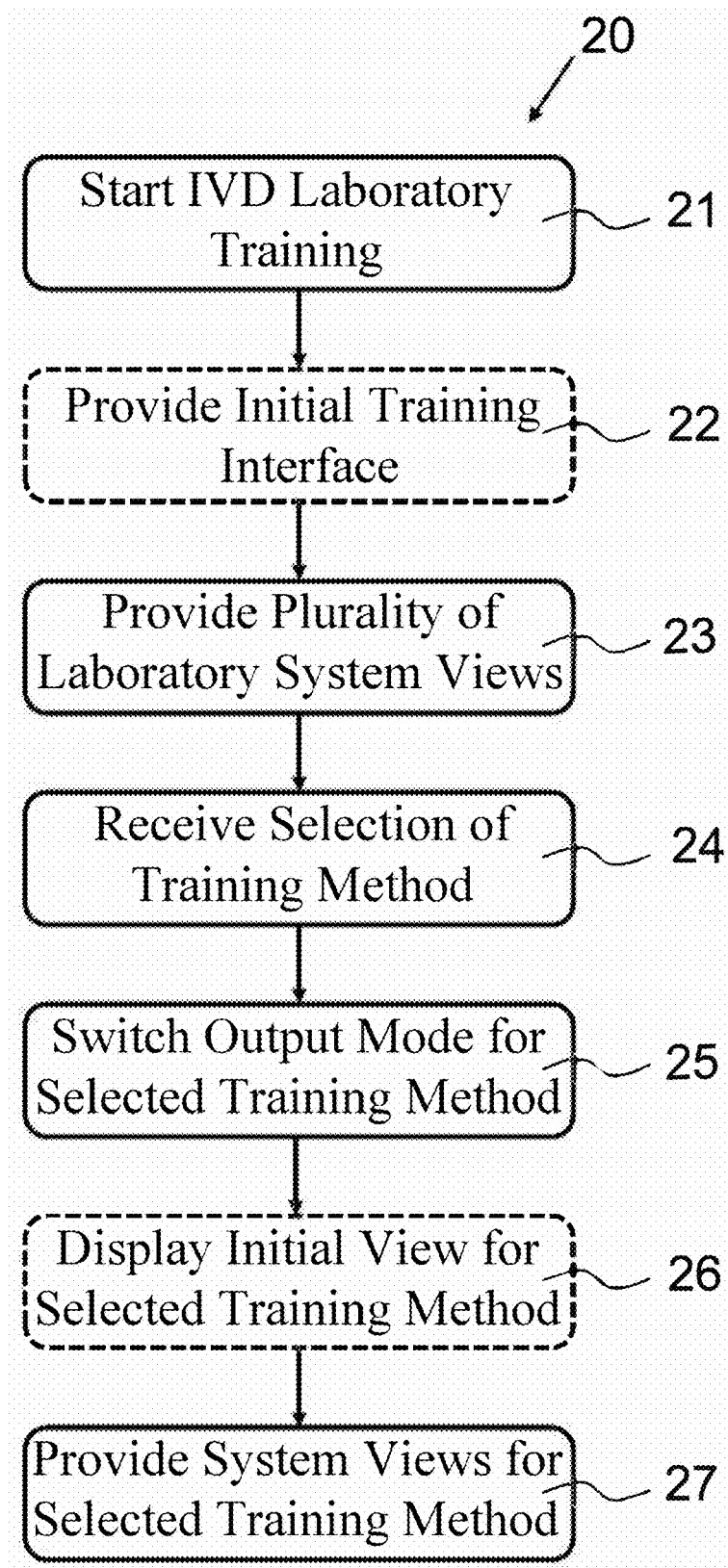
FIG. 2 shows a flowchart of an embodiment of the method for user-interactive training of methods performable in an IVD laboratory system by a computer-implemented training system.

FIG. 2 shows a flowchart of an embodiment of the method 20 for user-interactive training of methods performable in the IVD laboratory system 40 by the computer-implemented training system 1. The method 20 comprises a plurality of steps, wherein some of them are optional. According to step 21, a computer-implemented training system 1 for the IVD laboratory system 40 comprising the plurality of IVD instruments 30 designed for processing biological samples received IVD sample containers 33 is provided.

According to step 22, an initial first view from a plurality of first views is output via the output device 5, in particular the display device 11. The initial first view may correspond to a home screen of the system 1. In order to output the initial first view, a user input may not be required. The initial first view may be output upon starting the system, for example, in response to the user pressing a start button. The initial first view may show the IVD laboratory system 40 system, in particular, an overview of the IVD laboratory system 40. The initial first view can show the view that was last displayed before a previous system 1 shutdown. Step 22 is optional.

According to step 23, output of the plurality of first views of the IVD laboratory system 40 through the display device 11 is controlled by the control module 10. This controlling takes place in response to receiving first user input and in accordance with a first set of view parameters assigned to a first view output mode from the plurality of view output modes.

According to step 24, a training mode selection user input indicative of a user selection for a method to be trained from plurality of methods is received. In step 25, it is switched from the first view output mode to a second view output mode from the plurality of view output modes. Step 25 may be carried out in response to step 24, in particular in response to receiving the training mode selection user input indicative of a user selection for a method to be trained from the plurality of methods.

In step 26, an initial second view from a plurality of second views assigned to the training mode selected is output. Alternatively, the initial second view may not be assigned to the training mode. Step 26 may be comprised by step 25. In particular, step 26 may be carried out in response to step 24, e.g. in response to receiving the training mode selection user input indicative of the user selection for the method to be trained from the plurality of methods. The initial second view from the plurality of second views may show an instrument of the IVD laboratory system 40. In particular, the initial second view may show an IVD instrument of the IVD laboratory system 40 corresponding to the user selection input. Step 26 is optional.

In step 27, output of second views of the IVD laboratory system 40 through the display device 11 is (further) controlled by the control module 10. This controlling takes place in response to receiving the user input indicative of the user selection and in accordance with a second set of view parameters assigned to a second view output mode from the plurality of view output modes. The second view output mode is assigned to the method to be trained. The second set of view parameters is different from the first set of view parameters.

Figure 3:
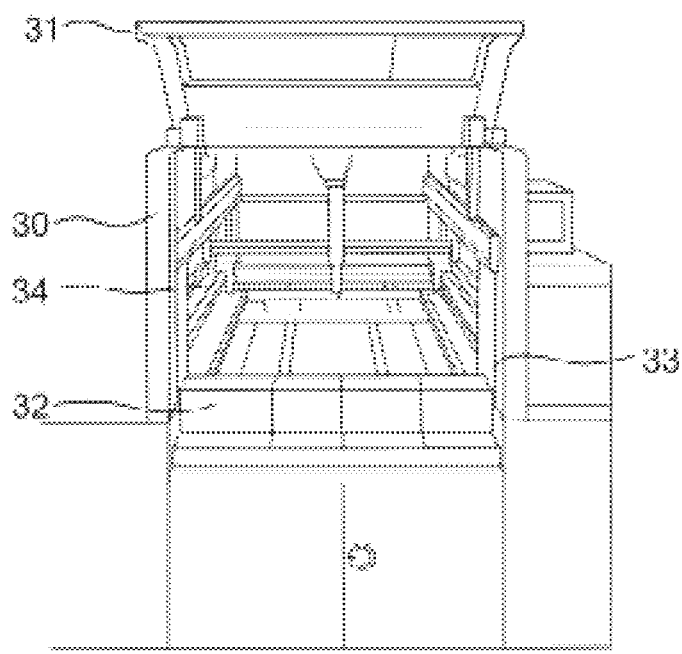
FIG. 3 shows a graphical representation of an instrument/module of the IVD laboratory system.

FIG. 3 shows a graphical representation of an IVD instrument 30 of the IVD laboratory system 40. The IVD instrument 30 is a part or an element of the IVD laboratory system 40. The IVD instrument 30 is configured to operate for at least one of pre-analytics, analytics, and post-analytics. In the example shown, the IVD instrument 30 comprises a lid 31, a drawer 32, an interior 34, and IVD sample containers 33. The IVD sample containers 33 are accommodated in an IVD sample container holder or carrier. The carrier accommodates a plurality of IVD sample containers 33. One or more carriers may be received by one drawer 32. The lid 31 is a door that swings up. When closed, the lid 31 can hide the interior 34. When opened, the lid 31 can be arranged in such a way that it does not hide the interior 34. The IVD instrument 30 is configured to process one or more IVD sample containers 33.

Figure 4:
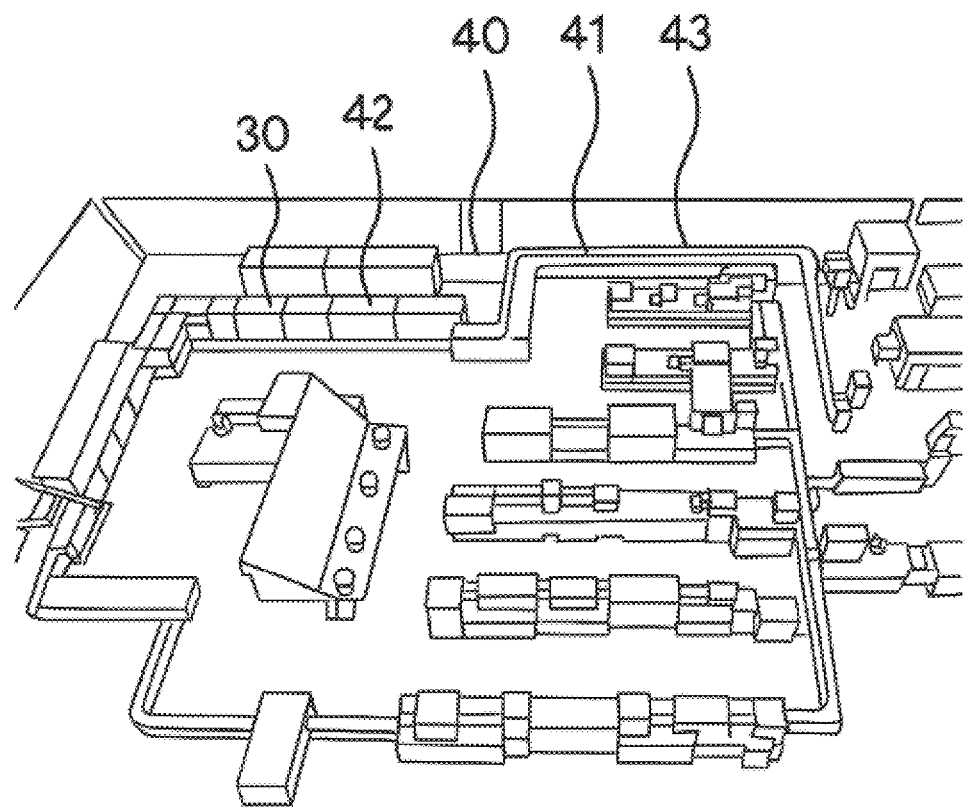
FIG. 4 shows a graphical representation of the IVD laboratory system.

FIG. 4 shows a graphical representation of the IVD laboratory system 40. The IVD laboratory system 40 comprises a plurality of IVD instruments 30 and arrangements of IVD instruments 42. The instruments 30/arrangements 42 are designed for processing the biological IVD sample containers 33 (resp. the samples thereof), in particular along a line of processing. The order in which the instruments 30 process the sample containers 33 or the samples received in the sample containers 33 can correspond to a (sample or sample container) workflow. In addition, the IVD laboratory system 40 comprises a transport system 41 for transporting the IVD sample containers 33, in particular from instrument-to-instrument. The transport system 41 is configured to transport the IVD sample containers 33 in the IVD laboratory system 40, wherein the IVD sample containers 33 may be received in a holder. The transport system 41 is configured to transport the IVD sample containers 33 along the sample container flow 43. The transport can be automated.

FIGS. 5a to 5h show a graphical representation of exemplary views output by the display device 11 that are displayed according to a first embodiment comprising a training mode.

FIG. 5a corresponds to an initial first view 51.1 from the plurality of first views 51 to be output in the first view output mode. The initial first view 51.1 shows a three-dimensional view of the IVD laboratory system 40. The initial first view 51.1 shown in FIG. 5a represents only one of a number of possible initial first views of the plurality of first views 51. Other three-dimensional views of the IVD laboratory system 40 can also be provided. The initial first view 51.1 in FIG. 5a virtually represents the view of a user in the IVD laboratory system 40.

Upon user input, the user may change the view. In particular, upon user input, the user can virtually walk through the IVD laboratory system 40. In response to user input, the view may change from the initial first view 51.1 to another first view 51.2 of the plurality of first views 51 (see FIG. 5b). The other first view 51.2 shows a three-dimensional view of the IVD laboratory system 40 that is different from the three-dimensional view of the IVD laboratory system 40 corresponding to the initial first view 51.1. The change of view gives the user the impression that it was moved from a first position (first camera perspective) in the IVD laboratory system 40 corresponding to the initial first view 51.1 to a second position (second camera perspective) in the IVD laboratory system 40 corresponding to the other first view 51.2 from the plurality of first views 51.

Starting from the initial first view 51.1, the user has the option, via user input, to get additional first views 52' from the plurality of first views displayed. The additional first views 52, 52' show a three-dimensional view of the IVD instrument 30. The additional first views 52, 52' can correspond to an information view 52' (A, see FIGS. 5c, 5d) or to a maintenance view 52 provided in a training mode of operation (B, see FIGS. 5e to 5h).

Several additional first views 51.3, 51.4 are provided in FIGS. 5c, 5d. An additional first views 51.3 in FIG. 51.3 shows a system view of the IVD instrument 30. The IVD instrument 30 has been selected by the user, for example, in the other first view 51.2. The system view corresponds to a view of the IVD instrument 30 from the front which shows the entire IVD instrument 30. The additional first views 51.3 may comprise a hiding section 56 of the IVD instrument 30. In the example shown in FIG. 5c, the hiding section 56 is the lid 31. The lid 31 hides the interior 34. In response to user input, in particular in response to user input in the initial first view 51.3, it can be switched between the additional first views 51.3, 51.4 in FIGS. 5c and 5d.

The additional first view 51.4 in FIG. 5d corresponds to a detailed view of the IVD instrument 30. The detailed view of the IVD instrument 30 shows the interior 34 of the IVD instrument 30. The he additional first view 51.4 is a hidden section view. In the additional first view 51.4, the interior 34 of the IVD instrument 30 is uncovered. The plurality of first views 51 comprises, according to FIG. 5d, interactive information buttons 53, for example, corresponding to several processes in (the interior 34 of) the IVD instrument 30. The interior 34 comprises tools, for example, a gripping device 57 configured for gripping and transporting samples in the IVD instrument 30. In response to selecting one of the interactive information buttons 53, corresponding information data may be output via the display device 11 (not shown).

Alternatively, the user will be provided a plurality of second views 52 (B, see FIGS. 5e, to 5h). The plurality of second views 52 is assigned to a training mode, such as a maintenance mode of operation (maintenance training mode). An initial second view 52.1 of the plurality of second views 52 shows a system view of the IVD instrument 30 in FIG. 5e. The initial second view 52.1 corresponds to a first maintenance step. The first maintenance step is a preparation step. In the initial second view 52.1, it is shown which hardware is required for the selected maintenance (method to be trained). For the maintenance process of FIG. 5, a pair of tweezers and a tissue are required. Visual representations of the required hardware are displayed in the initial second view 52.1. To at least one of the displayed required hardware, an interactive information button 53 may be assigned (not shown in FIG. 5e). In response to selecting this interactive information button 53 by the user, information data of the corresponding hardware may be displayed.

In addition, the initial second view 52.1 shows an interactive step button 54. The interactive step button 54 is a start button. In response to selecting the start button, a visual representation of the actual first maintenance step is displayed. Additional second views 52.2 and 52.3 plurality of second views 52 correspond to one of such actual maintenance steps. In particular, the change between the additional second views 52.2, 52.3 corresponds to one maintenance step. The additional second view 52.2 comprises a further interactive step button 55. The position of the further interactive step button 55 (in FIG. 5f) is indicative of the position where the user is required to interact with the IVD instrument 30. In response to selecting the further interactive step button 55, an animation of the maintenance step may be output.

The second view output mode provided for outputting one or more of the plurality of second views 52 may comprise outputting several second views (not shown). The additional second view 52.3 from the plurality of second views 52 shows the state of the IVD instrument 30 after this maintenance step. Further interactive step button 55 is again displayed (see FIG. 5g), the selection of which is used to display a subsequent maintenance step.

This sequence can be repeated until all maintenance steps have been performed. Accordingly, the view corresponding to a state of the IVD instrument 30 in which the last maintenance step has been completed may have no interactive step button. A further second view 52.4 from the plurality of second views 52 (FIG. 5h) shows an interaction between the user and the IVD instrument 30. The hand movements to be performed by the user are shown. For this purpose, a visual representation of a hand 57 is shown, which is provided by an animation of the hand being an animation, i.e. not being an element of the IVD laboratory system 40.

Alternatively to selecting between continuing in the first view output mode by following procedure according to FIGS. 5c, 5d or switching to the second view output mode (for training) by following procedure according to FIGS. 5e to 5h, the user may be provided with the option to select between different second view output modes each assigned to a training method.

Figure 6A:
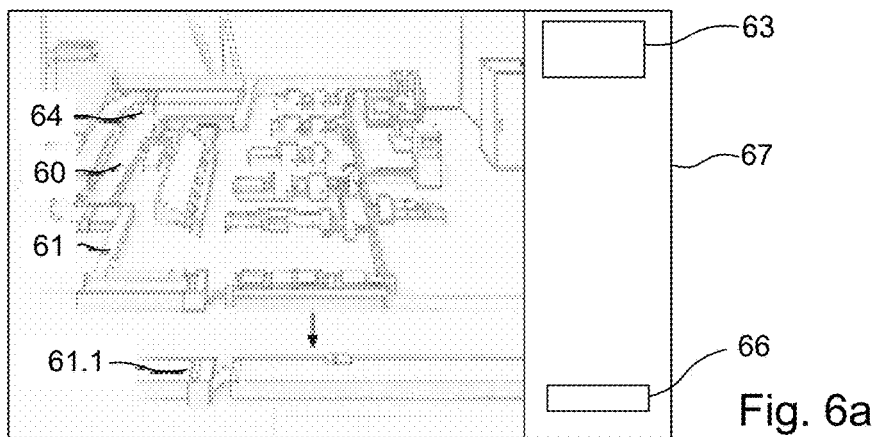
FIGS. 6A-6D show a graphical representation of exemplary views/images output by the display device that are displayed during training according to a second embodiment.
Figure 6B:
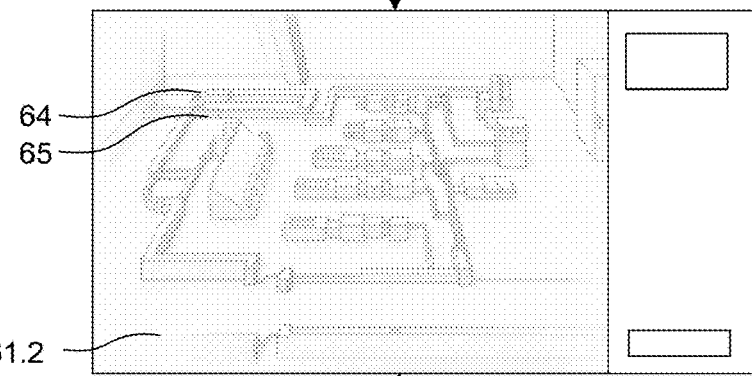
Figure 6C:
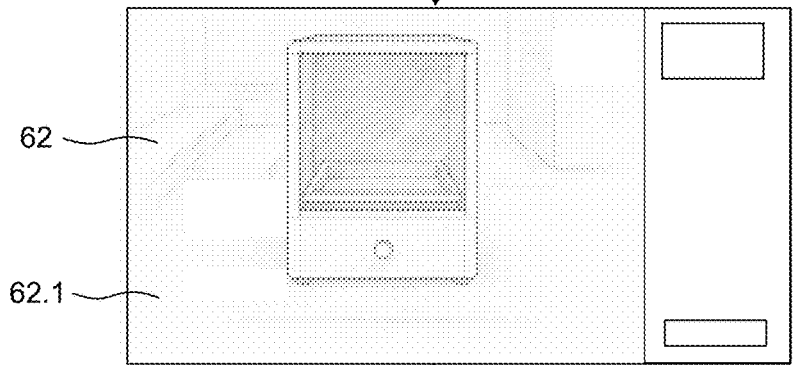

FIGS. 6a to 6c shows a graphical representation of exemplary views output by the display device 11 that are displayed in a second embodiment comprising a training mode.

According to FIG. 6a, an initial first view 61.1 form the plurality of first views 61 corresponds to a display output 60. The initial first view 61.1 shows the entire IVD laboratory system 40 from above. The initial first view 61.1 corresponds to a visual representation of a first workflow step. In the initial first view 61.1, the IVD sample container 33 (of interest) is located at a first position which may correspond to the first workflow step/sample flow step. This position is indicated by a visual representation of the IVD sample container 64.

The IVD instrument 30 corresponding to the first workflow step (workflow instrument step) is identified by a marker 65. In an information box 67, information of the currently shown workflow step are presented. Via interactive step buttons 66, the user can switch between the plurality of first views 61 corresponding to neighboring workflow steps. In particular, the user can use these interactive step buttons 66 to switch from the currently displayed initial first view 61.1 to another first view that corresponds to either a workflow step that is downstream or upstream of the workflow step associated with the currently displayed initial first view 61.1.

FIG. 6b shows another first view 61.2 of the plurality of first views. The other first view 61.2 corresponds to a workflow step that is upstream of the workflow step associated with the initial first view 61.1. Accordingly, the position of the IVD sample container 33 and the IVD instrument 30 that is marked in the second view of the plurality of first views 61.2 are different from the position of the sample containers 33 and the IVD instrument 30 that is marked in the initial first view 61.1.

Figure 6D:
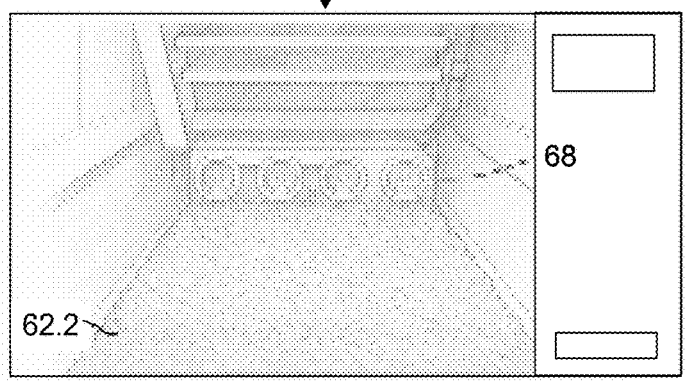

Upon user selection, a plurality of second views 62 is displayed in a second view output mode for training (see FIGS. 6c, 6d). The user selection may correspond to a click of the user on the marked IVD instrument 30 in one from the plurality of the first views 61. The plurality of second views 62 comprise a system view 62.1 and a detailed view 62.2. The detailed view 62.2 from the plurality of second views 62 corresponds to a visual representation of the sample flow in the IVD instrument 30. To each sample flow step 68, an interactive information button 53 may be assigned. By selecting (clicking on) one of these interactive information buttons 53, information text about the corresponding sample flow step 68 can be displayed in the information box 67.

What is claimed is:

1. A computer-implemented training system for user-interactive training of a plurality of methods performable in an IVD laboratory system, comprising:
   one or more data processors;
   a memory device connected to the one or more data processors;
   a user interface provided with an output device having a display device and an input device configured to receive user input; and
   one or more software applications running on the one or more data processors and having a plurality of application modules, comprising:
   a visualization module configured to provide a digital visualization of an IVD laboratory system, the IVD laboratory system comprising a plurality of IVD instruments designed for processing biological samples;

an IVD method module configured to provide method control data for a plurality of IVD methods performable in the IVD laboratory system, each of the IVD methods having assigned a sequence of method steps;

a view output mode module configured to provide view output control data for controlling a plurality of view output modes each assigned a set of view parameters for outputting views of the IVD laboratory system, wherein the views are generated from the digital visualization of the IVD laboratory system; and a control module configured to control user-interactive training for the plurality of methods;

wherein the plurality of application modules is further configured to:

control, in response to receiving first user input, output of first views of the IVD laboratory system through the display device according to first view output control data indicative of a first set of view parameters assigned to a first view output mode from the plurality of view output modes by the control module;

receive a training mode selection user input indicative of a user selection for an IVD method to be trained from the plurality of IVD methods;

switch from the first view output mode to a second view output mode from the plurality of view output modes; and control, in response to receiving second user input, output of second views of the IVD laboratory system through the display device according to second view output control data indicative of a second set of view parameters assigned to the second view output mode by the control module, wherein:

the second view output mode is assigned to the IVD method to be trained;

the second set of view parameters is different from the first set of view parameters; and the second view output mode is configured to prevent outputting one or more of the first views of the IVD laboratory system.

2. The computer-implemented training system of claim 1 wherein, by the first set of view parameters, the first view output mode is configured to provide, in response to receiving user input, multi-dimensional views of the plurality of IVD instruments from the visualization of the IVD laboratory system.

3. The computer-implemented training system of claim 1 wherein for training of the IVD method, by the second set of view parameters, the second view output mode is configured to limit output of views, in response to receiving user input, to multi-dimensional views of one or more IVD instruments from the plurality of IVD instruments, the one or more IVD instruments being assigned to the sequence of method steps of the IVD method to be trained.

4. The computer-implemented training system of claim 1 further comprising assigning a camera position selectable by user input to each view generated from the visualization of the IVD laboratory system.

5. The computer-implemented training system of claim 4, wherein:

by the first set of view parameters, the first view output mode is configured to provide, in response to receiving user input, first multi-dimensional views generated from the visualization of the IVD laboratory system; and a first set of camera positions allowed for the first view output mode is assigned to the first multi-dimensional views.

6. The computer-implemented training system of claim 5, wherein:

for training of the IVD method, by the second set of view parameters, the second view output mode is configured to provide, in response to receiving user input, second multi-dimensional views generated from the visualization of the IVD laboratory system; and a second set of camera positions allowed for the second view output mode is different from the first set of camera positions is assigned to the second multi-dimensional views.

7. The computer-implemented training system of claim 6, wherein the second set of camera positions allowed for the second view output mode is configured to limit the second set of camera positions to a plurality of camera positions around a fixed focal point assigned to the IVD method to be trained.

8. The computer-implemented training system of claim 7, further comprising assigning the fixed focal point to an IVD instrument from the plurality of IVD instruments, wherein the IVD method to be trained is to be performed at least in part with the IVD instrument.

9. The computer-implemented training system of claim 1, wherein the plurality of application modules is further configured to provide, for controlling the output of the first views in the first view output mode, a free view output mode assigned a set of free view parameters configured to output, in response to user input, a sequence of views not restricted to a particular sequence of IVD method steps.

10. The computer-implemented training system of claim 1 wherein the plurality of second views comprises a first group of second views assigned to a first view level and a second group of second views assigned to a second view level which is different from the first view level, wherein the first group of second views is assigned at least a first common view parameter and the second group of second views is assigned at least a second common view parameter which is different from the first common view parameter.

11. The computer-implemented training system of claim 1 wherein the plurality of application modules is further configured to provide, for controlling the output of the second views in the second view output mode for training of the method, an ordered view output mode assigned an ordered set of view parameters configured to interactively outputting an ordered sequence of second views of the method steps of the IVD method selected by training mode selection user input.

12. The computer-implemented training system of claim 1 wherein, for controlling the output of the second views in the second view output mode for training of the method, the plurality of application modules is further configured to:

present an interactive step button within the second views, and switch from a present second view comprising presentation of the interactive step button to a following second view in response to receiving user input for selecting the interactive step button through the input device, wherein the present second view and the following second view are assigned to consecutive method steps of the sequence of method steps of the IVD method to be trained.

13. The computer-implemented training system of claim 12, wherein the plurality of application modules is further configured to:

present at most one interactive step button within the second views; or present at most one interactive step button within second views assigned to method steps prior to a final method step of the consecutive method steps.

14. The computer-implemented training system of claim 1, wherein, for controlling the output of the second views in the second view output mode for training of the method, the plurality of application modules is further configured to:

present an interactive information button within the second views, and output information data through the display device in response to receiving user input for selecting the interactive information button through the input device.

15. The computer-implemented training system of claim 1, wherein the views generated from the digital visualization of the IVD laboratory system comprise hidden section views representing views of a hidden section of the IVD instrument from the plurality of IVD instruments, the hidden section being covered by a hiding section of the IVD instrument in a first view and uncovered in a hidden section view.

16. The computer-implemented training system of claim 15, further comprising, in response to receiving user input, uncovering the hidden section and outputting a hidden section view representing the hidden section through the display device.

17. The computer-implemented training system of claim 1 further comprising providing a digital visualization of an IVD laboratory system configured to operate for at least one of pre-analytics, analytics, and post-analytics.

18. The computer-implemented training system of claim 1 wherein, by the first set of view parameters, the first view output mode is configured to provide, in response to receiving user input, holistic views of the plurality of IVD instruments from the visualization of the IVD laboratory system.

19. The computer-implemented training system of claim 1 wherein:

the plurality of application modules is further configured to provide, for the output of the second views in the second view output mode for training of the method, a chronologically ordered sequence of second views assigned to different processing times of the IVD laboratory system; and each second view from the chronologically ordered sequence is showing a marker in the IVD laboratory system indicative of a position of an IVD sample container to be processed by the IVD laboratory system.

20. The computer-implemented training system of claim 1 wherein:

the plurality of application modules is further configured to provide, for controlling the output of the second views in the second view output mode for training of the method, a chronologically ordered sequence of second views assigned to different processing times of an IVD instrument from the plurality of IVD instruments; and each second view is showing a processing state of the IVD instrument.

21. The computer-implemented training system of claim 1 wherein:

the receiving of the training mode selection user input comprises receiving a user input indicative of a user selection of a first IVD instrument from the plurality of IVD instruments;

the switching from the first view output mode to the second view output mode takes place in response to the receiving of the IVD instrument selection; and the second views correspond to the first IVD instrument.

22. A method for user-interactive training of methods performable in an IVD laboratory system by a computer-implemented training system, the method comprising:

providing a computer-implemented training system for an IVD laboratory system comprising a plurality of IVD instruments designed for processing biological samples, the computer-implemented training system comprising:

one or more data processors;

a memory device connected to the one or more data processors;

a user interface provided with an output device having a display device and an input device configured to receive user input; and one or more software applications running on the one or more data processors and having a plurality of application modules, comprising:

a visualization module configured to provide a digital visualization of an IVD laboratory system, the IVD laboratory system comprising a plurality of IVD instruments designed for processing biological samples;

a method module configured to provide method control data for a plurality of methods performable in the IVD laboratory system, each of the methods having assigned a sequence of method steps;

a view output mode module configured to provide view output control data for controlling a plurality of view output modes each assigned a set of view parameters for outputting views of the IVD laboratory system, wherein the views are generated from the digital visualization of the IVD laboratory system; and a control module configured to control user-interactive training for the plurality of methods;

controlling, in response to receiving first user input, output of first views of the IVD laboratory system through the display device according to first view output control data indicative of a first set of view parameters assigned to a first view output mode from the plurality of view output modes by the control module;

receiving a training mode selection user input indicative of a user selection for a method to be trained from the plurality of methods;

switching from the first view output mode to a second view output mode from the plurality of view output modes; and controlling, in response to receiving second user input, output of second views of the IVD laboratory system through the display device according to second view output control data indicative of a second set of view parameters assigned to the second view output mode by the control module, wherein:

the second view output mode is assigned to the method to be trained;

the second set of view parameters is different from the first set of view parameters; and the second view output mode is configured to prevent outputting one or more of the first views of the IVD laboratory system.

* * * * *